US007058135B2

(12) United States Patent
Poslinski et al.

(10) Patent No.: US 7,058,135 B2
(45) Date of Patent: Jun. 6, 2006

(54) DATA ELEMENT REORDERING FUNCTION

(75) Inventors: Thomas Poslinski, San Diego, CA (US); Kim A. Ryal, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 33 days.

(21) Appl. No.: 10/867,031

(22) Filed: Jun. 14, 2004

(65) Prior Publication Data

US 2005/0041747 A1 Feb. 24, 2005

Related U.S. Application Data

(63) Continuation of application No. 09/630,576, filed on Aug. 3, 2000, now Pat. No. 6,782,056.

(60) Provisional application No. 60/146,979, filed on Aug. 3, 1999.

(51) Int. Cl.
*H04L 7/04* (2006.01)

(52) U.S. Cl. ...................... 375/262; 275/130

(58) Field of Classification Search ................ 375/262, 375/130; 370/394; 709/246; 714/819, 755; 711/165
See application file for complete search history.

(56) References Cited

U.S. PATENT DOCUMENTS

| 5,173,897 | A | | 12/1992 | Schrodi et al. ............. 370/394 |
| 5,339,311 | A | | 8/1994 | Turner ........................ 370/394 |
| 5,383,182 | A | | 1/1995 | Therasse et al. ............ 370/394 |
| 5,566,183 | A | * | 10/1996 | Partyka ....................... 714/701 |
| 5,572,532 | A | * | 11/1996 | Fimoff et al. ............... 714/702 |
| 5,590,122 | A | | 12/1996 | Sandorfi et al. ............ 370/394 |
| 5,917,835 | A | * | 6/1999 | Barrett et al. ............... 714/755 |
| 6,226,687 | B1 | | 5/2001 | Harriman et al. ........... 709/246 |
| 6,421,796 | B1 | * | 7/2002 | Gatherer ..................... 714/702 |
| 6,434,148 | B1 | | 8/2002 | Park ........................... 370/394 |
| 6,529,558 | B1 | * | 3/2003 | Fimoff et al. ............... 375/262 |
| 6,782,056 | B1 | * | 8/2004 | Poslinski et al. ........... 375/262 |

* cited by examiner

*Primary Examiner*—Emmanuel Bayard
*Assistant Examiner*—Lawrence Williams
(74) *Attorney, Agent, or Firm*—Mayer & Williams PC; Heather Mansfield, Esq.; Karin L. Williams, Esq.

(57) ABSTRACT

Apparatuses for reordering a plurality of data elements that utilize a buffer capable of storing at least one data element. The last data element (Pn) is located and moved to the buffer. The data element (Px) that should be located at the location of the last data element (Pn) is moved to fill the space vacated. If the last data element should be located at the location of Px, then the last but one (Pn−1) element is located and moved to the buffer. The element (Px') that should be located at the location of Pn−1 is then moved to the location of Pn−1. The process is repeated until all the data elements are reordered.

23 Claims, 6 Drawing Sheets

DATA ELEMENT REORDERING FUNCTION

STATEMENT OF RELATED APPLICATION

This application is a continuation and claims the benefit of prior filed copending application Ser. No. 09/630,576, filed Aug. 3, 2000 now U.S. Pat. No. 6,782,056, which is incorporated by reference herein in its entirety. This application also claims the benefit of provisional application Ser. No. 60/146,979, filed Aug. 3, 1999, which is also incorporated by reference herein in its entirety.

COPYRIGHT NOTICE

Appendix "A" of the disclosure of this patent application contains material, which is subject to copyright protection. The copyright owner has no objection to the facsimile reproduction of the patent document or the patent disclosure, as it appears in the Patent and Trademark Office patent file or records, but otherwise reserves all copyrights whatsoever.

FIELD OF THE INVENTION

Aspects of the present invention involve data reordering, and in particular apparatuses for reordering data elements, such as digital spread spectrum (DSS) data packets, using a reduced memory buffer.

BACKGROUND OF THE INVENTION

In Direct-TV data protocol, program guides are sent as a collection of data packets. FIG. 1A shows a DSS transmitter 101 that transmits DSS data packets that are received by a DSS receiver 102 and routed to a SDRAM 103. The packets are stored in a random order.

FIG. 1B shows a typical SDRAM 103 with data packets (PO–P8) 105 stored at different locations 104, illustrated as LO–L8. FIG. 1B shows a first set of data packets 106 (packets PO–P4) stored at memory locations L4 to L8 respectively and a second set of data packets (P5–P8) 107 stored at memory locations LO to L3 respectively. However for efficient processing, the packets should be stored in the order illustrated in FIG. 1C. i.e. packet PO should be stored in location LO, PI in location L1 and so forth.

Currently a second memory buffer is used to reorder the data packets as they are received. FIG. 1D shows a second memory buffer 111 used for reordering data packets. When the first set 106 is received, in step S101, packets PO–P4 are moved to memory buffer 111. In step S102, data packets in second set 107 (P5–P8) are moved to the desired locations, L5–L8, as shown in FIG. 1C. Finally, in step S103, data packets in set 106 are moved to locations L0–L4. Currently, the reordering system is expensive and hence increases the overall system cost.

Therefore, what is needed is a system that can efficiently reorder incoming data packets without expensive memory buffer requirements.

SUMMARY OF THE INVENTION

According to one aspect of the present invention, an apparatus for reordering a plurality of data elements stored in a memory includes a computer-readable storage medium; and a processor responsive to the computer-readable storage medium and to a computer program. When the computer program is loaded into the processor, it is operative to perform a method including: locating, within the memory, a location (Ln) of a last data element (Pn) of the plurality of data elements; moving the last data element Pn to a buffer that can at least store one data element; and locating, within the memory, a data element (Px) of the plurality of data elements, stored at a location Lx, that should be located at the location Ln.

The apparatus may be a set-top device or a personal computer, and may further include an interface, operative to receive the plurality of data elements and to arrange for direction of the plurality of data elements to the memory. The interface may be a digital spread spectrum receiver or a bus. The plurality of data elements may be digital spread spectrum packets. The method may further include: if the last data element Pn should be located at the location Lx, locating, within the memory, a second last data element (Pn−1) of the plurality of data elements to the buffer; locating, within the memory, a data element (Px') of the plurality of data elements at a location Lx', that should be located within the memory at a location Ln−1 associated with the second last data element Pn−1; determining if the second last data element Pn−1 should be located at the location Lx'; and moving the data element Px' to the location Ln−1 if the second last data element Pn−1 is not to be located at the location Lx'. Thereafter, the method may include: determining a data element (Py) of the plurality of data elements that should be located at the location Lx; and moving the data element Px' to the location Lx; or the method may include determining a data element (Py') of the plurality of data elements that should be located at the location Lx'; and moving the data element Py' to the location Lx'.

According to another aspect of the present invention, a data reordering apparatus includes a plurality of random access memory locations for storing a plurality of data elements; a buffer memory location arranged to receive at least one of the plurality of data elements from at least one of the plurality of random access memory locations; and an interface in communication with the plurality of random access memory locations and the buffer memory location. The interface is operative for communication with a processor, in response to execution of a computer program by the processor, to provide access to the plurality of random access memory locations and the buffer memory location. When the interface is in communication with the processor, and when the computer program is loaded into the processor, the computer program is operative to perform a method for reordering the plurality of data elements, as generally described above. The buffer memory location may have a size of about one data element. The data reordering apparatus may be a memory or a processing unit of a computer arrangement, and the plurality of data elements may be digital spread spectrum data packets.

According to a further aspect of the present invention, a memory of a computer arrangement is arranged to cause the computer arrangement to: locate, within a plurality of random access memory locations, a location (Ln) of a last data element (Pn) of a plurality of digital spread spectrum (DSS) data elements; move the last data element Pn to a buffer memory location that can at least store a DSS data element; and locate a data element (Px) of the plurality of DSS data elements stored at location Lx within the plurality of random access memory locations, that should be located at the location Ln. The plurality of DSS data elements may be DSS data packets. The memory may further be arranged to cause the computer arrangement to: if the last data element Pn should be located at the location Lx, locate, within the plurality of random access memory locations, a second last data element (Pn–1) of the plurality of data elements to the buffer; locate, within the plurality of random access memory locations, a data element (Px') of the plurality of data elements at a location Lx', that should be located within the plurality of random access memory locations at a location Ln–1 associated with the second last data element Pn–1 ; determine if the second last data element Pn–1 should be located at the location Lx'; and move the data element Px' to the location Ln–1 if the second last data element Pn–1 is not to be located at the location Lx'. Thereafter, the memory may further be arranged to cause the computer arrangement to: determine a data element (Py) of the plurality of data elements that should be located at the location Lx; and move the data element Px' to the location Lx; or the method may be arranged to determine a data element (Py') of the plurality of data elements that should be located at the location Lx'; and move the data element Py' to the location Lx'.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The use of similar reference numerals in different figures indicates similar or identical items.

DETAILED DESCRIPTION OF THE PREFERRED EMBODIMENTS

Figure 2:
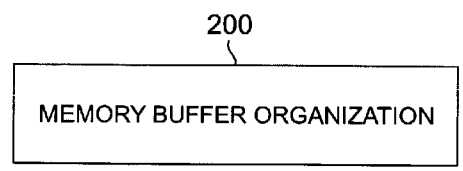
FIG. 2 is a block diagram of a memory buffer, according to one aspect of the present invention.

FIG. 2 shows a memory buffer 200 that is capable of storing data packets.

Figure 1A:
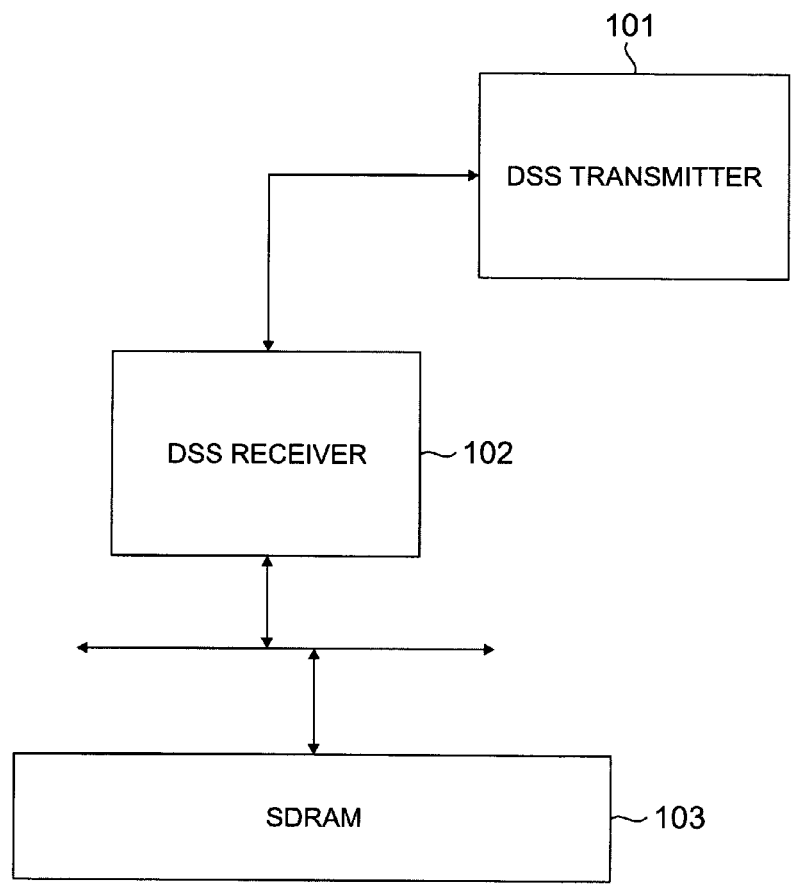
FIG. 1A is a block diagram showing data packet movement from a DSS transmitter to a SDRAM.
Figure 1B:
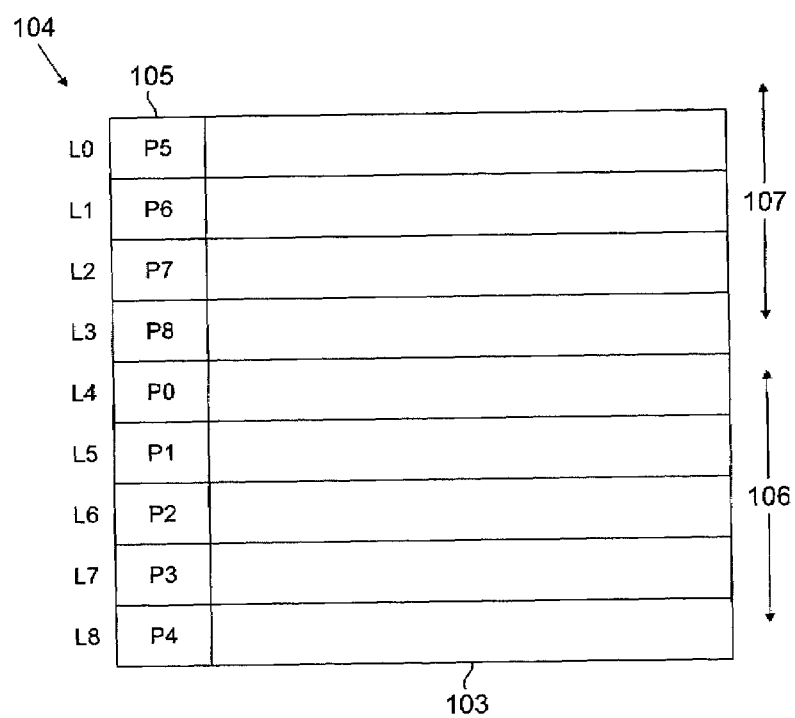
FIG. 1B is a block diagram of the SDRAM showing data packet storage locations.
Figure 1C:
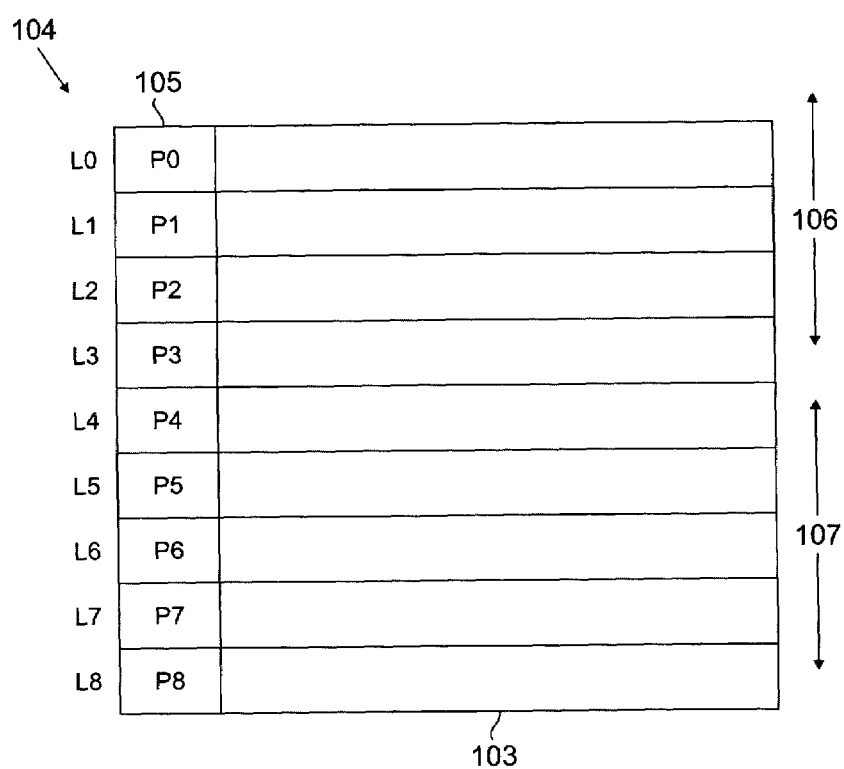
FIG. 1C is a block diagram of desirable data packet storage locations.
Figure 1D:
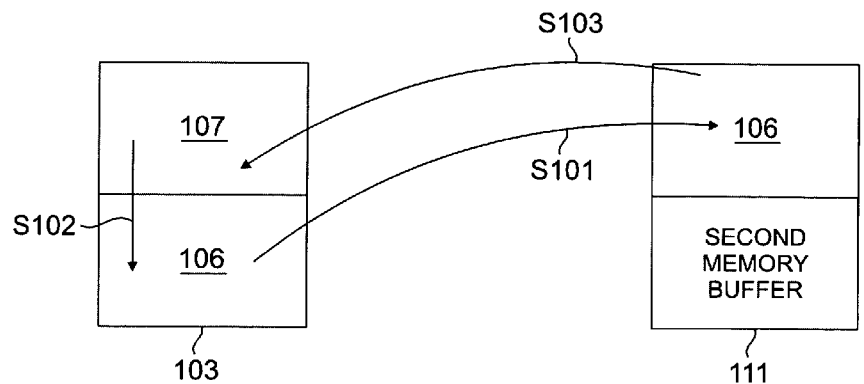
FIG. 1D is a basic flow chart showing the prior art process steps employed to reorder data packets according to conventional systems.
Figure 3:
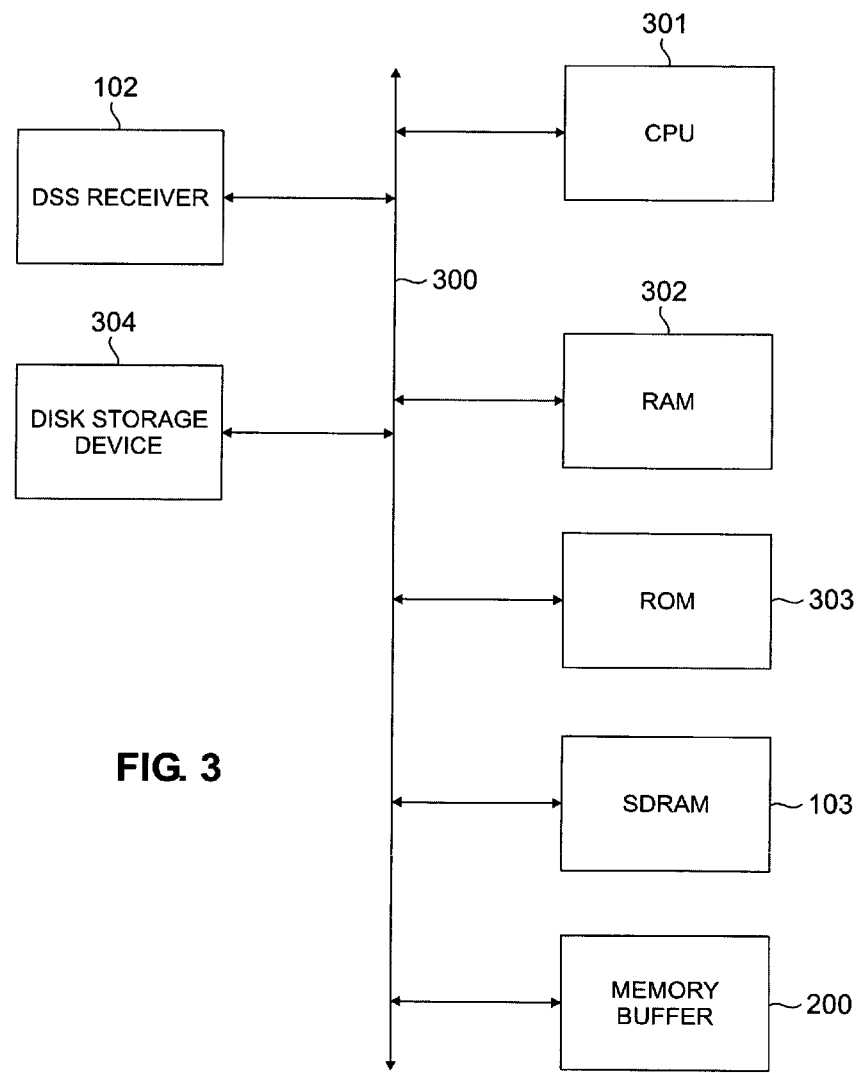
FIG. 3 is a block diagram of the system architecture to implement process steps according to another aspect of the present invention.

FIG. 3 shows a block diagram of the architecture, according to one aspect of the present invention to implement process steps to reorder DSS data packets which are received out of order, for example as illustrated in FIG. 1B, to a desired location, as illustrated in FIG. 1C. It is noteworthy, that the desired locations in FIG. 1C are merely to illustrate one aspect of the present invention and are not meant to limit the invention.

The system illustrated in the FIG. 3 block diagram can be used for a personal computer or a set top box architecture. FIG. 3 shows a CPU 301 for executing computer-executable (or microprocessor executable) process steps and interfaces with computer bus 300. Also shown in FIG. 3 is a rotating disk storage device 304 for storing data. It is noteworthy that the present invention is not limited to using a rotating disk or any specific storage device.

Disk storage device 304 stores operating system program files, computer executable process steps according to one aspect of the present invention and application program files etc. Some of these files are stored on disk 304 using an installation program. For example, CPU 301 executes computer-executable process steps of an installation program so that CPU 301 can properly execute the program.

A random access main memory ("RAM") 302 also interfaces to computer bus 300 to provide CPU 301 with access to memory storage. When executing stored computer-executable process steps from disk 304, CPU 301 stores those process steps in RAM 302 and executes the stored process steps out of RAM 302.

Read only memory ("ROM") 303 is provided to store invariant instruction sequences such as start-up instruction sequences or basic Input/output operating system (BIOS) sequences.

FIG. 3 also shows DSS receiver 102 that receives data packets from DSS transmitter 101 and then stores them in SDRAM 103. Memory buffer 200 is used to reorder data packets received in SDRAM 103, as described below. Typically, memory buffer 200 is capable of storing at least one data packet.

Figure 4:
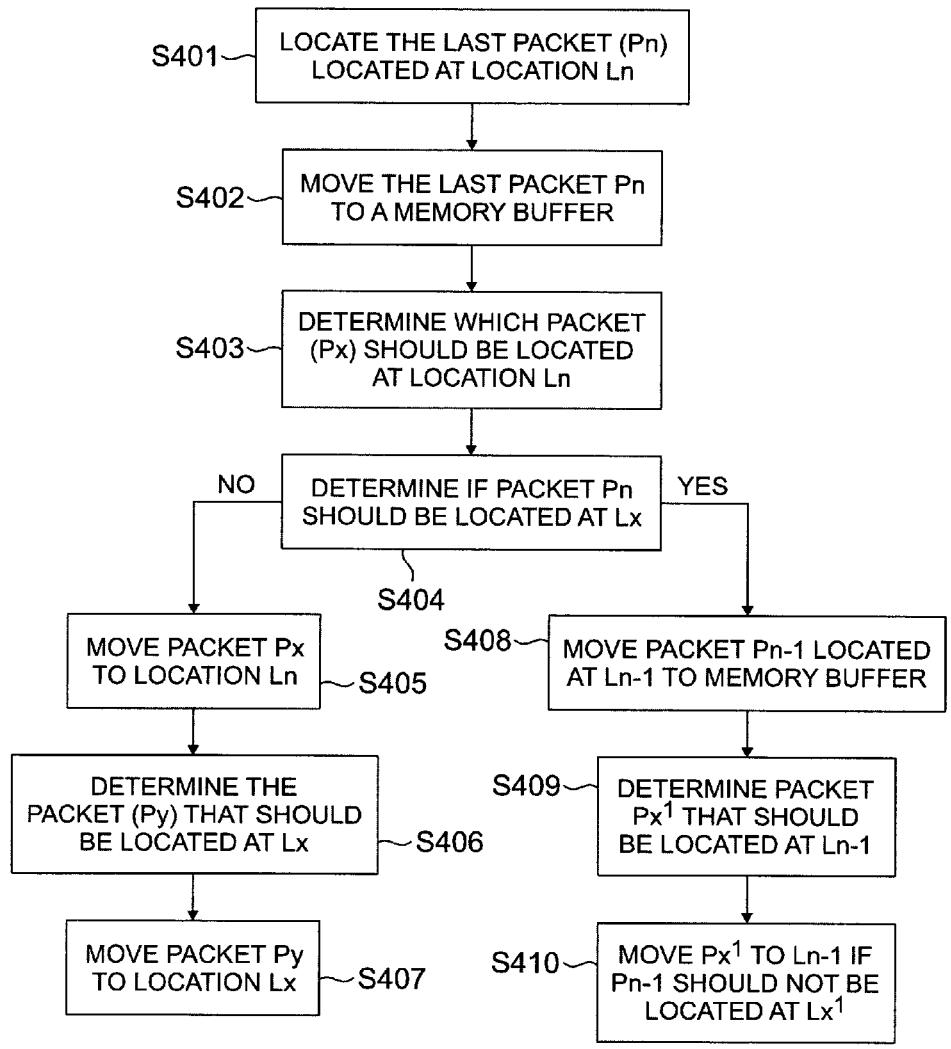
FIG. 4 is a basic flow chart showing process steps according to yet another aspect of the present invention.

FIG. 4 is a flow diagram of computer executable process steps to implement one aspect of the present invention. Generally, the FIG. 4 process steps illustrate a methodology for reordering data packets, such that only a small memory buffer, e.g., memory buffer 200 that can store at least one DSS data packet, is utilized. Data packets are arranged according to a desired data packet location scheme, e.g., as shown in FIG. 1C.

More specifically, in step S401, locate the location (Ln) of the last packet (Pn) in SDRAM 103. For illustration purposes only, location of the last packet (P8) is shown as L3 in FIG. 1B.

In step S402, move the last packet (P8, FIG. 1B) to memory buffer 200 that can store at least one data packet.

In step S403, determine the packet (Px) that should be stored at Ln. As illustrated in FIG. 1C, location L3 should have packet P3. Hence Px in this example is data packet P3.

In step S404, determine if Pn should be located at location Lx (where packet Px was located). For illustration purposes, determine if P8 is to be located at L7 (See FIG. 1C).

If Pn should not be stored at Ln (FIG. 1C), then in step S405, move Px (P3 from location L7 in FIG. 1B) to location Ln (L3 of FIG. 1C).

In step S406 determine a packet (Py) that should be located at location Lx. For illustration purposes, packet P7 at location L2 should be stored at location L7 (FIG. 1C). Hence Py in this case is packet P7.

In step S407, move Py to location Lx. Hence packet P7 is moved from L2 to L7. (FIG. 1C).

If in step S404, it is determined that Pn should be located at location Lx, then in step S408 move packet Pn–1 to memory buffer 200. For illustration purposes, if packet P8 were to be located at location L7, then move packet P7 from location L2 (FIG. 1B) to memory buffer 200.

In step S409, determine which packet (Px') should be stored at location Ln–1. For illustration purposes, packet P2 should be located at location L2 (FIG. 1C).

In step S410, move Px' to location Ln–1. For illustration purposes, P2 is moved from location L6 to L2 (FIG. 1B).

The foregoing process steps are repeated until all the data packets are reordered as shown in FIG. 1C. Appendix "A" provides an example of a DSS packet reordering system to implement the foregoing aspects of the present invention. Appendix "A" provides a sample of computer executable code for DSS packet reordering, according to one aspect of the present invention. One skilled in the art of computer programming can practice the foregoing aspects of the present invention by using the sample code disclosed in Appendix "A".

By virtue of the foregoing aspects of the present invention, a memory buffer that is smaller than conventional systems is required to reorder numerous data packets. Hence memory cost is reduced and that reduces the overall cost of the system. Furthermore, the present process is more efficient than the conventional prior art systems because data packets are only moved once, unlike conventional systems where data packets are moved more than once.

APPENDIX "A"

```
VOID
Pgl_gu_packet_reorder(USIGNED8   *buf_p,
              USIGNED32        filter,
              USIGNED8         max_packets,
              PgSD_sat_type_t  sat_type_t cur_network)
{
    register USIGNED8    *next_buf_p;
    register USIGNED8    *hole_buf_p;
    register USIGNED8    *temp_buf_p;
    register USIGNED8    segm_packet;
    register USIGNED16   max_bytes;
    USIGNED8             pckt_cnt;
    USIGNED8             packets;
    USIGNED8             shift_index;
    USIGNED8             *find_buf_p;
    USIGNED8             temp_buf[127];
    USIGNED8             pre_filter;
    /** Find Filter **/
    /** Start with last packet **/
    find_buf_p = (buf_p + ((max_packets - 1) * pgPD_DIRECTV_PACKET_SIZE));
    pre_filter = ((filter >> 24) & Oxff);
    for (segm_packet = 0; segm_packet < max_packets; segm_packet++)
    {
        /**Read first byte is faster **/
        jf (pgm_ut_readbyte(find_buf_p) = = pre_filter)
        {
            if((unsigned int)pgm_ut_read4bytes(find_buf_p) == filter)
            {
                break;
            }
        }
        /**Point to previous packet **/
        find_buf_p- = pgPD_DIRECTV_PACKET_SIZE;
    }
    if(segm_packet == max_packets)
    {
        /A failure indicates that no reordering could be done/
        return;
    }
    /**Readjust because we started from the back of the buffer **/
    segm_packet = (max_packets - segm_packet - 1);
    if segm_packet = = 0)
    {
        /** No Reordering is necessary **/
        /** SEGM is first packet already **/
        return;
    }
    /**Precalculate number of bytes in packet buffer **/
    max_bytes = (max_packets*pgPD_DIRECTV_PACKET_SIZE);
    /**MPG is out of sequence **/
    for (packets=0, shift_index=0; packets < max_packets; shift_index++)
    {
        next_buf_p=buf_jp=((segm_packet+shift_index)*
            pgPD_DIRECTV_PACKET_SIZE);
        if(next_buf_p >= (buf_p + max_bytes))
        {
            next_buf_p = max_bytes;
        }
        /Store start of copy pointer/
        temp_buf_p = next_buf_p;
        /**Store packet on stack **/
        memcpy (temp_buf, temp_buf_p, pgPD_DIRECTV_PACKET_SIZE);
        /** Start Packet Moving **/
        for (pckt_cnt=O; pckt_cnt < (max_packets - 1); pckt_cnt++)
        {
            hole_buf_p = next_buf_p;
            /** Store pointer to current hole produced by last copy **/
            /**Point to next packet **/
            next_buf_p+=(segm_packet*pgPD_DIRECTV _PACKET_SIZE);
```

APPENDIX "A"-continued

```
    if (next_buf_p > + max_bytes))
    {
        /Went past the end of the buffer/
        next_buf_p -= max_bytes)
    }
        if (next_buf_p = = temp_buf_p)
{
            /**Before all the packets were copied the start
            packet is the next packet to be copied. Need to shift forward
            to prevent oscillation **/
            break;
    }
    /Copy appropriate packet into hole/
        memcpy(hole_buf_p, next_buf_p, pgPD _DIRECTV_
    PACKET_SIZE;
        packets++;
    }
    /** Copy temp buffer into next of last packet location **/
    memcpy((buf_p+(shift_index*pgPD_DIRECTV_PACKET_SIZE)),
    temp_buf, pgPDDIRECTV_PACKET_SIZE);
        packets++;
    }
}
```

The invention claimed is:

1. An apparatus for reordering a plurality of data elements stored in a memory, the apparatus comprising:
 a computer-readable storage medium; and
 a processor responsive to the computer-readable storage medium and to a computer program, the computer program, when loaded into the processor, operative to perform a method comprising:
  locating, within the memory, a location (Ln) of a last data element (Pn) of the plurality of data elements;
  moving the last data element (Pn) to a buffer that can at least store one data element; and
  locating, within the memory, a data element (Px) of the plurality of data elements, stored at a location (Lx), that should be located at the location (Ln).

2. The apparatus according to claim 1, wherein the apparatus comprises a set-top device.

3. The apparatus according to claim 1, wherein the apparatus comprises a personal computer.

4. The apparatus according to claim 1, further comprising:
 an interface, operative to receive the plurality of data elements and to arrange for direction of the plurality of data elements to the memory.

5. The apparatus according to claim 4, wherein the interface comprises a digital spread spectrum receiver.

6. The apparatus according to claim 5, wherein the plurality of data elements comprise digital spread spectrum data packets.

7. The apparatus according to claim 4, wherein the interface comprises a bus.

8. The apparatus according to claim 1, wherein the method further comprises:
 if the last data element (Pn) should be located at the location (Lx), locating, within the memory, a second last data element (Pn−1) of the plurality of data elements to the buffer;
 locating, within the memory, a data element (Px') of the plurality of data elements at a location (Lx'), that should be located within the memory at a location (Ln−1) associated with the second last data element (Pn−1);
 determining if the second last data element (Pn−1) should be located at the location (Lx'); and moving the data element (Px') to the location (Ln−1) if the second last data element (Pn−1) is not to be located at the location (Lx').

9. The apparatus according to claim 8, wherein the method further comprises:
 determining a data element (Py) of the plurality of data elements that should be located at the location (Lx); and
 moving the data element (Py) to the location Lx.

10. The apparatus according to claim 8, wherein the method further comprises:
 determining a data element (Py') or the plurality of data elements that should be located at the location (Lx'); and
 moving the data element (Py') to the location (Lx').

11. A data reordering apparatus, comprising:
 a plurality of random access memory locations for storing a plurality of data elements;
 a buffer memory location arranged to receive at least one of the plurality of data elements from at least one of the plurality of random access memory locations; and
 an interface in communication with the plurality of random access memory locations and the buffer memory location, the interface operative for communication with a processor, in response to execution of a computer program by the processor, to provide access to the plurality of random access memory locations and the buffer memory,
 wherein when the interface is in communication with the processor, and when the computer program is loaded into the processor, the computer program is operative to perform a method for reordering the plurality of data elements, the method comprising:
  locating, within the plurality of random access memory locations, a location (Ln) of a last data clement (Pn) of the plurality of data elements;
  moving the last data element (Pn) to the buffer memory location; and
  locating, within the plurality of random access memory locations, a data element (Px) of the plurality of data elements, stored at location (Lx), that should be located at the location (Ln).

12. The data reordering apparatus according to claim 11, wherein the buffer memory location has a size of about one data element.

13. The data reordering apparatus according to claim 11, wherein the data reordering apparatus comprises a memory of a computer arrangement.

14. The data reordering apparatus according to claim 11, wherein the data reordering apparatus comprises a processing unit of a computer arrangement.

15. The data reordering apparatus according to claim 11, wherein the plurality of data elements comprise digital spread spectrum data packets.

16. The data reordering apparatus according to claim 11, wherein the method further comprises:
- if the last data element (Pn) should be located at the location (Lx) locating, within the plurality of random access memory locations, a second last data element (Pn−1) of the plurality of data elements to the buffer memory location;
- locating, within the plurality of random access memory locations, a data element (Px') of the plurality of data elements at a location (Lx'), that should be located within the plurality of random access memory locations at a location (Ln−1) associated with the second last data element (Pn−1);
- determining if the second last data element (Pn−1) should be located at the location (Lx'); and
- moving the data element (Px') to the location (Ln−1) if the second last data element Pn−1 is not to be located at the location (Lx').

17. The data reordering apparatus according to claim 16, wherein the method further comprises:
- determining a data element (Py) of the plurality of data elements that should be located at the location (Lx); and
- moving the data element (Px') to the location (Lx).

18. The data reordering apparatus according to claim 16, wherein the method further comprises:
- determining a data element (Py') of the plurality of data elements that should be located at the location (Lx'); and
- moving the data element (Py') to the location (Lx').

19. A memory of a computer arrangement, the memory being arranged to cause the computer arrangement to:
- locate, within a plurality of random access memory locations, a location (Ln) of a last data element (Pn) of a plurality of digital spread spectrum (DSS) data elements;
- move the last data element (Pn) to a buffer memory location that can at least store a DSS data element; and
- locate, within the plurality of random access memory locations, a data element (Px) of the plurality of DSS data elements, stored at a location (Lx), that should be located at the location (Ln).

20. The memory according to claim 19, wherein the plurality of DSS data elements comprise DSS data packets.

21. The memory according to claim 19, being further arranged to cause the computer arrangement to:
- if the last data element Pn should be located at the location (Lx), locate, within the plurality of random access memory locations, a second last data element (Pn−1) of the plurality of data elements to the buffer memory location;
- locate, within the plurality of random access memory locations, a data element (Px') of the plurality of data elements at a location (Lx'), that should be located within the plurality of random access memory locations at a location (Ln−1) associated with the second last data element (Pn−1 );
- determine if the second last data element (Pn−1) should be located at the location (Lx'); and
- move the data element Px' to the location (Ln−1) if the second last data element (Pn−1) is not to be located at the location (Lx').

22. The memory according to claim 21, being further arranged to cause the computer arrangement to:
- determine a data element (Py) of the plurality of data elements that should be located at the location (Lx); and
- move the data element (Px') to the location (Lx).

23. The memory according to claim 21, being further arranged to cause the computer arrangement to:
- determine a data element (Py') of the plurality of data elements that should be located at the location (Lx'); and
- move the data element (Py') to the location (Lx').

* * * * *

UNITED STATES PATENT AND TRADEMARK OFFICE
CERTIFICATE OF CORRECTION

PATENT NO.       : 7,058,135 B2
APPLICATION NO.  : 10/867031
DATED            : June 6, 2006
INVENTOR(S)      : Thomas Poslinski et al.

It is certified that error appears in the above-identified patent and that said Letters Patent is hereby corrected as shown below:

Specification, Col. 1, line 7, after "Aug. 3, 2000" insert -- , --.

Specification, Col. 1, line 25, after "particular", insert -- , --.

Specification, Col. 2, line 2, before "to", change "Pn" to -- (Pn) --.

Specification, Col. 2, line 5, after "location", change "Lx" to -- (Lx) --.

Specification, Col. 2, line 6, after "location", change "Ln" to -- (Ln) --.

Specification, Col. 2, line 14, after "element", change "Pn" to -- (Pn) --.

Specification, Col. 2, line 14, after "location", change "Lx" to -- (Lx) --.

Specification, Col. 2, line 18, after "location", change "Lx' " to -- (Lx') --.

Specification, Col. 2, line 19, after "location", change "Ln-1" to -- (Ln-l) --.

Specification, Col. 2, line 20, after "element", change "Pn-1" to -- (Pn-l) --.

Specification, Col. 2, line 21, after "element", change "Pn-1" to -- (Pn-1) --.

Specification, Col. 2, line 22, after "location", change "Lx' " to -- (Lx') --.

Specification, Col. 2, line 22, after "element", change "Px' " to -- (Px') --.

Specification, Col. 2, line 23, change first word "Ln-1" to -- (Ln-1) --.

Specification, Col. 2, line 23, after "element", change first word "Pn-l" to -- (Pn-l) --.

Specification, Col. 2, line 24, after "location", change "Lx' " to -- (Lx') --.

Specification, Col. 2, line 26, after "location", change "Lx" to -- (Lx) --.

Specification, Col. 2, line 27, after "element", change "Px' " to -- (Px') --.

Specification, Col. 2, line 27, after "location", change "Lx" to -- (Lx) --.

Specification, Col. 2, line 30, after "location", change "Lx' " to -- (Lx') --.

UNITED STATES PATENT AND TRADEMARK OFFICE
CERTIFICATE OF CORRECTION

PATENT NO.         : 7,058,135 B2
APPLICATION NO. : 10/867031
DATED                 : June 6, 2006
INVENTOR(S)      : Thomas Poslinski et al.

It is certified that error appears in the above-identified patent and that said Letters Patent is hereby corrected as shown below:

Specification, Col. 2, line 30, after "element", change "Py' " to -- (Py') --.

Specification, Col. 2, line 31, change first word "Lx' " to -- (Lx') --.

Specification, Col. 2, line 58, after "element", change "Pn" to -- (Pn) --.

Specification, Col. 2, line 61, after "location", change "Lx" to -- (Lx) --.

Specification, Col. 2, line 63, after "location", change "Ln" to -- (Ln) --.

Specification, Col. 2, line 65, after "element", change last word "Pn" to -- (Pn) --.

Specification, Col. 2, line 66, after "location", change "Lx" to -- (Lx) --.

Specification, Col. 3, line 4, after "location", change "Lx' " to -- (Lx') --.

Specification, Col. 3, line 6, change first word "Ln-l" to -- (Ln-1) --.

Specification, Col. 3, line 6, after "element", change last word "Pn-1" to -- (Pn-1) --.

Specification, Col. 3, line 7, after "element", change "Pn-1" to -- (Pn-1) --.

Specification, Col. 3, line 8, after "location", change "Lx' " to -- (Lx') --.

Specification, Col. 3, line 8, after "element", change "Px' " to -- (Px') --.

Specification, Col. 3, line 9, after "location", change "Ln-l" to -- (Ln-1) --.

Specification, Col. 3, line 9, after "element", change "Pn-l" to -- (Pn-l) --.

Specification, Col. 3, line 10, after "location", change "Lx' " to -- (Lx') --.

Specification, Col. 3, line 13, after "location", change "Lx" to -- (Lx) --.

Specification, Col. 3, line 14, after "element", change "Px' " to -- (Px') --.

Specification, Col. 3, line 14, after "location", change "Lx" to -- (Lx) --.

Specification, Col. 3, line 16, after "location", change last word "Lx' " to -- (Lx') --.

UNITED STATES PATENT AND TRADEMARK OFFICE
CERTIFICATE OF CORRECTION

PATENT NO. : 7,058,135 B2
APPLICATION NO. : 10/867031
DATED : June 6, 2006
INVENTOR(S) : Thomas Poslinski et al.

It is certified that error appears in the above-identified patent and that said Letters Patent is hereby corrected as shown below:

Specification, Col. 3, line 17, after "element", change "Py' " to -- (Py') --.

Specification, Col. 3, line 17, after "location", change last word "Lx' " to -- (Lx') --.

Specification, Col. 4, line 37, after "at", change "Ln" to -- (Ln) --.

Specification, Col. 4, line 38, after "hence", change "Px" to -- (Px) --.

Specification, Col. 4, line 39, after "if", change "Pn" to -- (Pn) --.

Specification, Col. 4, line 40, change first word "Lx", to -- (Lx) --.

Specification, Col. 4, line 40, after "packet", change "Px" to -- (Px) --.

Specification, Col. 4, line 42, after "if", change "Pn" to -- (Pn) --.

Specification, Col. 4, line 42, after "at", change "Ln" to -- (Ln) --.

Specification, Col. 4, line 43, after "move", change "Px" to -- (Px) --.

Specification, Col. 4, line 44, change first word "Ln" to -- (Ln) --.

Specification, Col. 4, line 47, after "location", change "Lx", to -- (Lx) --.

Specification, Col. 4, line 49, after "hence", change "Py", to -- (Py) --.

Specification, Col. 4, line 50, after "move", change "Py", to -- (Py) --.

Specification, Col. 4, line 50, after "location", change "Lx", to -- (Lx) --.

Specification, Col. 4, line 52, after "that", change "Pn" to -- (Pn) --.

Specification, Col. 4, line 53, after "location", change "Lx", to -- (Lx) --.

Specification, Col. 4, line 53, after "packet", change "Pn-l" to -- (Pn-1) --.

Specification, Col. 4, line 58, after "location", change "Ln-1" to -- (Ln-l) --.

Specification, Col. 4, line 60, after "move", change "Px' " to -- (Px') --.

UNITED STATES PATENT AND TRADEMARK OFFICE
CERTIFICATE OF CORRECTION

PATENT NO. : 7,058,135 B2
APPLICATION NO. : 10/867031
DATED : June 6, 2006
INVENTOR(S) : Thomas Poslinski et al.

It is certified that error appears in the above-identified patent and that said Letters Patent is hereby corrected as shown below:

Specification, Col. 4, line 60, after "location", change "Ln-1" to -- (Ln-1) --.

Claim 9, Col. 8, line 34, after "location", change last word "Lx", to -- (Lx) --.

Claim 10, Col. 8, line 37, before "the", change "or", to -- of --.

Claim 16, Col. 9, line 32, after "element", change "Pn-1" to -- (Pn-1) --.

Claim 21, Col. 10, line 17, after "element", change "Pn" to -- (Pn) --.

Signed and Sealed this

Thirty-first Day of July, 2007

JON W. DUDAS
*Director of the United States Patent and Trademark Office*